US006666383B2

(12) United States Patent
Goff et al.

(10) Patent No.: US 6,666,383 B2
(45) Date of Patent: Dec. 23, 2003

(54) SELECTIVE ACCESS TO MULTIPLE REGISTERS HAVING A COMMON NAME (75) Inventors: Lonnie C. Goff, Tempe, AZ (US); Gabriel R. Munguia, Phoenix, AZ (US)

(73) Assignee: Koninklijke Philips Electronics N.V., Eindhoven (NL)

(*) Notice: Subject to any disclaimer, the term of this patent is extended or adjusted under 35 U.S.C. 154(b) by 220 days.

(21) Appl. No.: 09/871,135

(22) Filed: May 31, 2001

(65) Prior Publication Data

US 2002/0179719 A1 Dec. 5, 2002

(51) Int. Cl.[7] .............................................. G06K 19/06
(52) U.S. Cl. ...................... 235/492; 235/454; 235/379; 235/380; 705/41; 712/227; 712/202; 711/220; 711/217
(58) Field of Search .................... 235/492; 712/227, 712/202; 711/220, 217

(56) References Cited

U.S. PATENT DOCUMENTS

| 5,551,033 | A | 8/1996 | Foster et al. |
| 5,553,232 | A | 9/1996 | Wilhite et al. |
| 5,557,737 | A | 9/1996 | Wilhite et al. |
| 5,568,380 | A | 10/1996 | Brodnax et al. |
| 5,642,516 | A | 6/1997 | Hedayat et al. |
| 5,737,586 | A | 4/1998 | Gallup et al. |
| 5,974,525 | A | 10/1999 | Lin et al. |
| 5,987,258 | A | 11/1999 | Daniel et al. |
| 6,044,449 | A | 3/2000 | Garg et al. |
| 6,112,273 | A | 8/2000 | Kau et al. |
| 6,138,230 | A | * 10/2000 | Hervin et al. ............... 712/216 |
| 6,199,095 | B1 | 3/2001 | Robinson |
| 6,209,082 | B1 | 3/2001 | Col et al. |
| 6,212,609 | B1 | 4/2001 | Abramson et al. |
| 6,216,200 | B1 | 4/2001 | Yeager |
| 6,370,640 | B1 | * 4/2002 | Dowling ..................... 712/228 |

OTHER PUBLICATIONS

Furber S. B.: "VLSI RISC Architecture and Organization" 1989 , Marcel Dekker, Inc , New York, USA XP002211795 201970 p. 111—p. 117 p. 244—p. 250, 1,2,5,6,12–15,17, 7–11,16.

* cited by examiner

Primary Examiner—Michael G. Lee
Assistant Examiner—Allyson Sanders
(74) Attorney, Agent, or Firm—Peter Zawilski (57) ABSTRACT Among the embodiments of the present invention is a processor (22) having a number of registers in a register bank (50). The registers include a general purpose register (52a) and a stack pointer register (52b) having a common register name. Processor (22) includes logic responsive to programming to perform a program instruction that references the common register name. This instruction is performed with general purpose register (52a) under a first condition and with stack pointer register (52b) under a second condition. Accordingly, multiple registers identified by the same name can be selectively accessed based on the establishment of certain conditions.

30 Claims, 5 Drawing Sheets

SELECTIVE ACCESS TO MULTIPLE REGISTERS HAVING A COMMON NAME

BACKGROUND

The present invention relates to programmable apparatus and/or programming methods. More particularly, but not exclusively, the present invention relates to techniques to selectively access multiple registers of a programmable device that have the same programming identifier.

Digital processors and other programmable devices frequently include a number of individually accessible hardware registers. Typically, each register has a unique assembly language programming name or "logical identifier" that can be referenced by a corresponding assembly language instruction to utilize such register as an operand. Correspondingly, to some extent, higher-level application programs that have been complied into a lower-level executable form, are generally dependent upon a given register arrangement for proper operation.

From time-to-time, it is desirable to alter the register arrangement of a processor. In one common example, the total number of available registers is expanded as part of an effort to design a more capable "next generation" processor. In another example, a correction to an existing design can result in the addition of one or more hardware registers. Concomitant with these efforts, is the goal of maintaining compatibility with pre-existing programs.

Thus, there is an ongoing demand for new ways to implement changes to the register arrangement of a programmable device.

SUMMARY OF THE INVENTION

One embodiment of the present invention is a unique technique for utilizing multiple registers. Other embodiments of the present invention include unique devices, methods, systems, and apparatus to provide access to registers having a common register name or identifier.

A further embodiment of the present invention includes operating a programmable device including a first register and a second register that have a register name in common. This name is referenced in a programming instruction. The programming instruction is performed with the first register if a first condition is satisfied and with the second register if a second condition is satisfied.

Still a further embodiment comprises: operating a processor that has a number of registers, including a stack pointer register and a general purpose register with a register identifier in common; referencing this identifier with a programming instruction; and performing the programming instruction with one of the stack pointer register and the general purpose register based on a predefined condition.

In another embodiment, a processor includes a first register and a second register having a common identifier. This identifier is referenced by a programming instruction that is performed with the first register under a first condition and the second register under a second condition. The first condition and the second condition can each be established during a common mode of operating the processor. In one form, the first register is of a general purpose type and the second register provides a stack pointer.

For yet another embodiment of the present invention, a processor has two or more registers that include a first register and a second register with a register name in common. Under a first condition, this name is referenced to load a pointer to a memory space in the first register. Another programming instruction is executed that refers to the register name under a second condition to change contents of the second register. These contents are stored in the memory space based on the pointer provided with the first register.

Still another embodiment includes a programmable device with two or more registers that have the same programming identifier. If this identifier is referenced by a programming instruction, one of the registers is selected for access based on a condition/status. Access to one of the registers is more constrained than another. This constraint can be in terms of a limit on the quantity of instructions executed with the more constrained register for each establishment of the condition or status and/or a limit on the types of instructions that can be executed with the more constrained register.

For a further embodiment of the present invention, a programmable device is operated that includes a default register and an alternate register that are both identified by the same register name. A number of instructions are executed that reference this name with the default register unless a predefined condition is established. For each establishment of this condition, a preset instruction quantity limit for instruction performance with the alternate register instead of the default register is provided. In one form, this quantity limit is only one instruction, such that the predefined condition would need to be re-established for each instruction to be executed with the alternate register.

Yet a further embodiment is directed to an apparatus that carries programming instructions for execution by a processor. The processor includes a general purpose register and a stack pointer register having a register name in common. The programming instructions are operable to establish a stack pointer access condition, load a memory pointer into the stack pointer register by reference to the register name in response to establishment of this condition, reference the register name to perform a user routine with the general purpose register under an operating condition different than the stack pointer access condition, re-establish the stack pointer register access condition and store contents of the general purpose register in memory based on the pointer in response to an interrupt, perform an interrupt routine with the general purpose register, and restore the contents of the general purpose register from the memory based on the pointer after performance of the interrupt routine.

Accordingly, one object of the present invention is to provide a unique technique for utilizing multiple registers.

Another object of the present invention is to provide a unique device, method, system, or apparatus relating to multiple registers having a common name.

Further objects, embodiments, forms, features, benefits, and advantages of the present invention shall become apparent from the description and figures included herewith.

DETAILED DESCRIPTION OF SELECTED EMBODIMENTS

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment of the present invention, a processor includes a general purpose register and a stack pointer register that are referenced by the same assembly language identifier. If this identifier is referenced by an assembly language instruction, the instruction is executed with the general purpose register unless a predefined program operating status is established as a precondition to the reference. Access to or execution with the stack pointer register can otherwise be constrained or restricted to a subset of the instructions that can be performed with the general purpose register. Additionally or alternative, for each time the operating status is established, a preset instruction quantity limit can be imposed on instruction performance with the stack pointer register.

Figure 1:
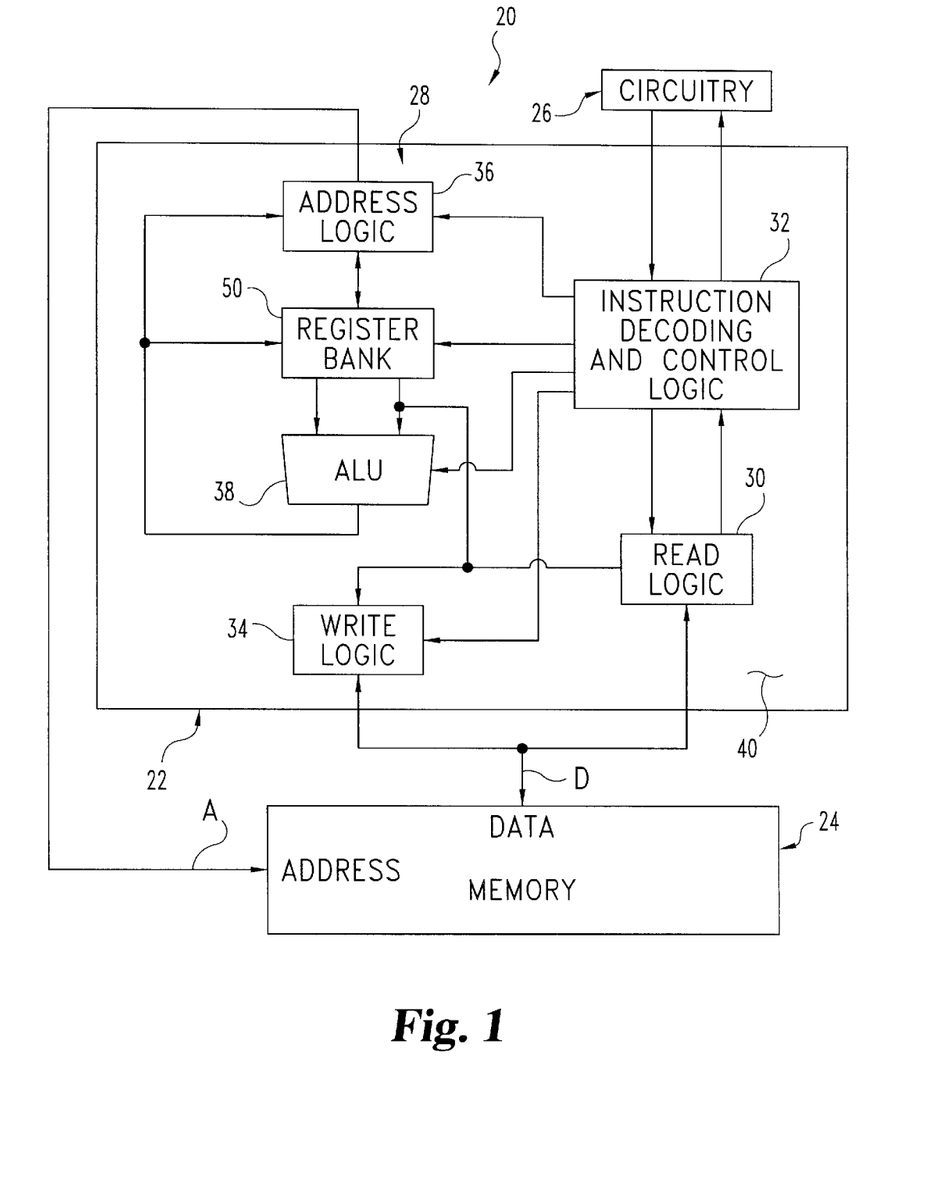
FIG. 1 is a diagrammatic view of a system according to the present invention.

FIG. 1 depicts processing system 20 of another embodiment of the present invention. Processing system 20 includes processor 22, memory 24, and peripheral circuitry 26. Processor 22 is operatively coupled to memory 24 by data bus D and address bus A, and is arranged to interface with memory 24 in a standard manner. Processor 22 includes a number of logic operators 28 that are schematically depicted in FIG. 1. Operators 28 include memory read logic 30 coupled to data bus D to selectively receive and hold information loaded from memory 24 until further processing can be performed. This information includes program instructions of processor 22 in an executable, microcode form. In one embodiment, read logic 30 is operable to pre-fetch instructions and establish an instruction pipeline. Alternatively or additionally, other forms of data can be stored and read from memory 24 with read logic 30. Read logic 30 can include one or more registers; register files; caches; and/or another local, high-speed memory arrangement operable to pre-process data and/or instructions.

Operators 28 also include decoding and control logic 32 operatively coupled to peripheral circuitry 26. Decoding and control logic 32 decodes instructions received from read logic 30 to direct operation of processor 22 through appropriate status and control signals to other operators 28 of processor 22. These control relationships are schematically represented by connecting lines with arrowheads. Alternatively or additionally, decoding and control logic 32 is responsive to inputs from circuitry 26 to accordingly direct operation of processor 22. Decoding and control logic 32 can also generate various status and control outputs to which circuitry 26 is responsive. By way of nonlimiting example, outputs from processor 22 to circuitry 26 can relate to processor mode status; memory interfacing; Digital-to-Analog (D/A) conversion, co-processing, data communication, and/or one or more different output signal types as would occur to one skilled in the art. Inputs from circuitry 26 to processor 22 can include one or more hardware interrupts, a processor reset and/or suspended operation signal, one or more clock or timing signals, one or more processor configuration signals, Analog-to-Digital (A/D) conversion signals, data communication signals, and/or one or more different input signal types as would occur to one skilled in the art.

For processor 22 a number of other operators 28 are depicted that are responsive to decoding and control logic 32, including read logic 30 previously described, write logic 34, address logic 36, Arithmetic/Logic unit (ALU) 38 and register bank 50. Write logic 34 is arranged to write data to memory 24 from processor 22, and can include one or more registers to hold data for output. Address logic 36 includes one or more registers for presenting an address on address bus A for read and write operations with read logic 30 and write logic 34, respectively. Address logic 36 can also include logic to increment/decrement addresses as needed. ALU 38 performs arithmetic and logical operations on data provided from memory 24 and/or register bank 50 in accordance with instructions decoded by decoding and control logic 32. Register bank 50 is comprised of various general purpose and special purpose registers as are further described in connection with the diagrams of FIGS. 2 and 4 hereinafter.

As depicted, processor 22 is in the form of an integrated circuit device 40. Alternatively, processor 22 can be comprised of two or more components and/or components of a different type. Processor 22 can include analog circuitry, digital circuitry, or a combination of these. The operation of processor 22 can be at least partially programmed with software, firmware, and/or logic in a hardwired, dedicated state-machine form. In one embodiment, processor 22 is arranged to operate as a 32-bit Reduced Instruction Set Computer (RISC) of the ARM7 or ARM9 family of processors provided by Advanced RISC Machines Limited.

Memory 24 can be comprised one or more components of a solid-state, electronic type and additionally or alternatively may include another type, such as the magnetic or optical variety, to name just a few. For example, memory 24 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a CD ROM); a magnetically encoded hard disc, floppy disc, tape, or cartridge media; or a combination of any of these types. Also, memory 24 may be volatile, nonvolatile or a hybrid combination of volatile and nonvolatile varieties.

Processor 22 is capable of executing instructions in several possible operating modes, with one mode being active at a time. A change from one mode to another is typically caused by programming, an external interrupt, or other exception handling as would occur to those skilled in the art. Different operating modes of processor 22 include a user mode for executing user routines, and one or more privileged modes, such as a supervisor mode for executing system management routines and one or more interrupt modes for executing interrupt handling routines. Commonly, applications are arranged such that privileged modes are triggered to handle certain exceptions that occur as a user program or routine is being performed in the user mode.

Figure 2:
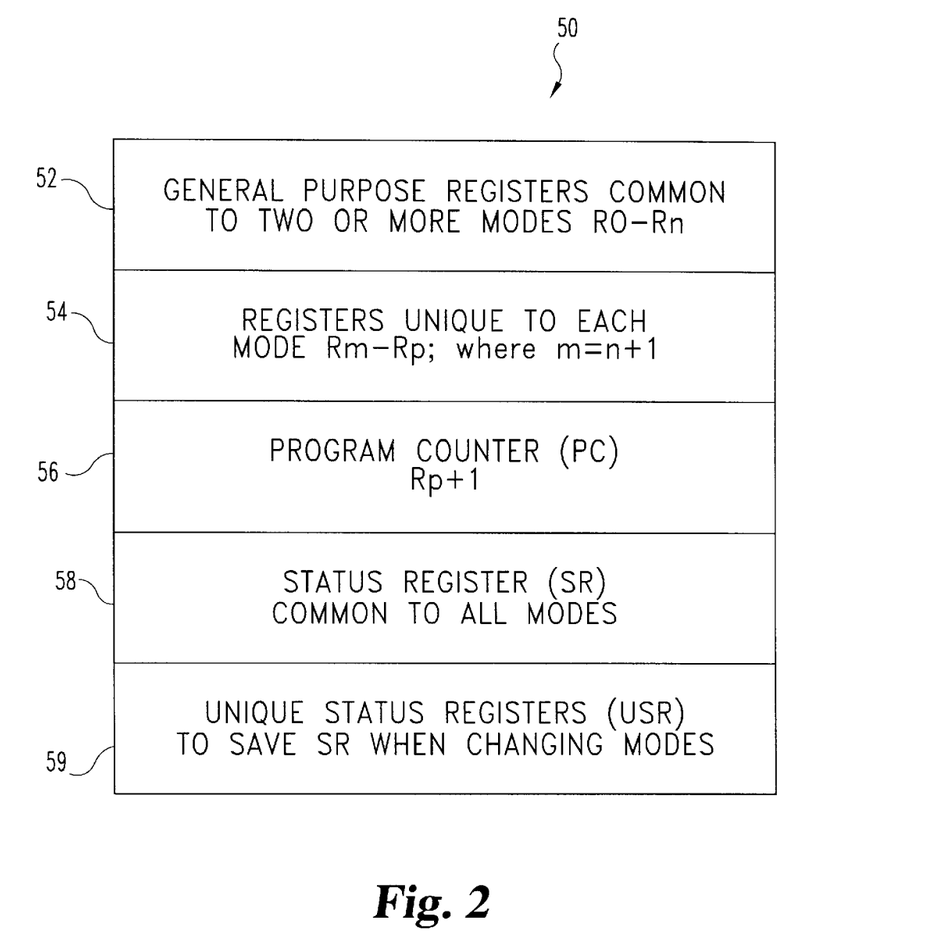
FIG. 2 is diagrammatic view showing details of a register bank of the system of FIG. 1.

Referring additionally to FIG. 2, register bank 50 includes general purpose register set 52. The members of register set 52 are general purpose hardware registers that can be accessed among two or more operational modes of processor 22 such as the user mode and one or more privileged modes. The individual hardware registers of set 52 are designated by programming identifiers or names corresponding to the series R0, R1, . . . Rn; where n is an index integer and the total number of general registers in set 52 is one greater than n. For an embodiment based on the ARM7 RISC processor, general purpose register operands R0 through R7 are common to all operating modes, and register operands R8–R12 are common to all but one mode.

For assembly level programming, a given register's programming name, such as "R0," is referenced by an assembly instruction to use the corresponding hardware register as a program operand. It should be understood that if a mode change occurs, the contents of registers in register set 52 can be accessed and changed by the next mode. Accordingly, in some embodiments a memory stack is created to save the contents of one or more general purpose hardware registers as part of a mode change. In one common example, a routine executing in the user mode is suspended to execute an interrupt handler in a privileged mode. For this example, the interrupt handler typically saves the user mode state of the general purpose registers in a memory stack, services the interrupt, restores the user mode state of the general purpose registers from the memory stack, and switches back to user mode to resume the user routine.

Register bank 50 also includes private register set 54. Each member of register set 54 is unique to a particular operating mode of processor 22. Members of register set 54 are generally named in accordance with the series Rm, Rm+1, ..., Rp; where m=n+1 and may include some further nomenclature to distinguish registers that are private to each operating mode, but have a common numerical designation. For instance, the ARM7 nomenclature utilizes R13, R13_fiq, R13_svc, R13abt, R13_irq, and $R_{13}$_und to refer to the private "R13" registers for each of its different operating modes. A comparable designation is utilized for the private "R14" registers. Accordingly, unlike registers in set 52, the contents of the private registers of set 54 are preserved without needing to save and restore state from a memory stack.

Register 56 is a standard program counter (PC) register that is common to all modes and utilized in a common manner. General status register 58 (alternatively designated register SR) provides status of various conditionals and operations reflective of a program executing in the currently active operating mode of processor 22. General status register 58 is shared by all processor operating modes. Register set 59 is also provided in register bank 50 that includes a unique status saving register (USR) for each of the privileged modes of operation. The members of register set 59 are each configured to save the contents of the general status register 58 when switching from one mode to the next. Accordingly, registers in set 59 provide for the restoration of the status register SR upon return to an earlier executed mode under certain circumstances. For the ARM7 embodiment, register 58 is designated by the operand name CPSR and the members of register set 59 are designated by SPSR_fiq, SPSR_svc, SPSR_abt, SPSR_irq, and SPSR_und.

It has been found that in certain instances, one or more additional registers are desired to enhance operation. It has further been found that this additional register can be referenced in programming instructions by the same name as a preexisting register. For a given operating mode, the preexisting register is referenced under one condition while the stack pointer register is referenced under a different condition. In one form, the preexisting register is of a general purpose type, and the added register is provided as a dedicated stack pointer for the purpose of saving and restoring general purpose registers of set 52. This arrangement is desirable for some embodiments in which a dedicated stack pointer for referencing a memory stack to save and/or read general purpose register contents is absent.

Figure 4:
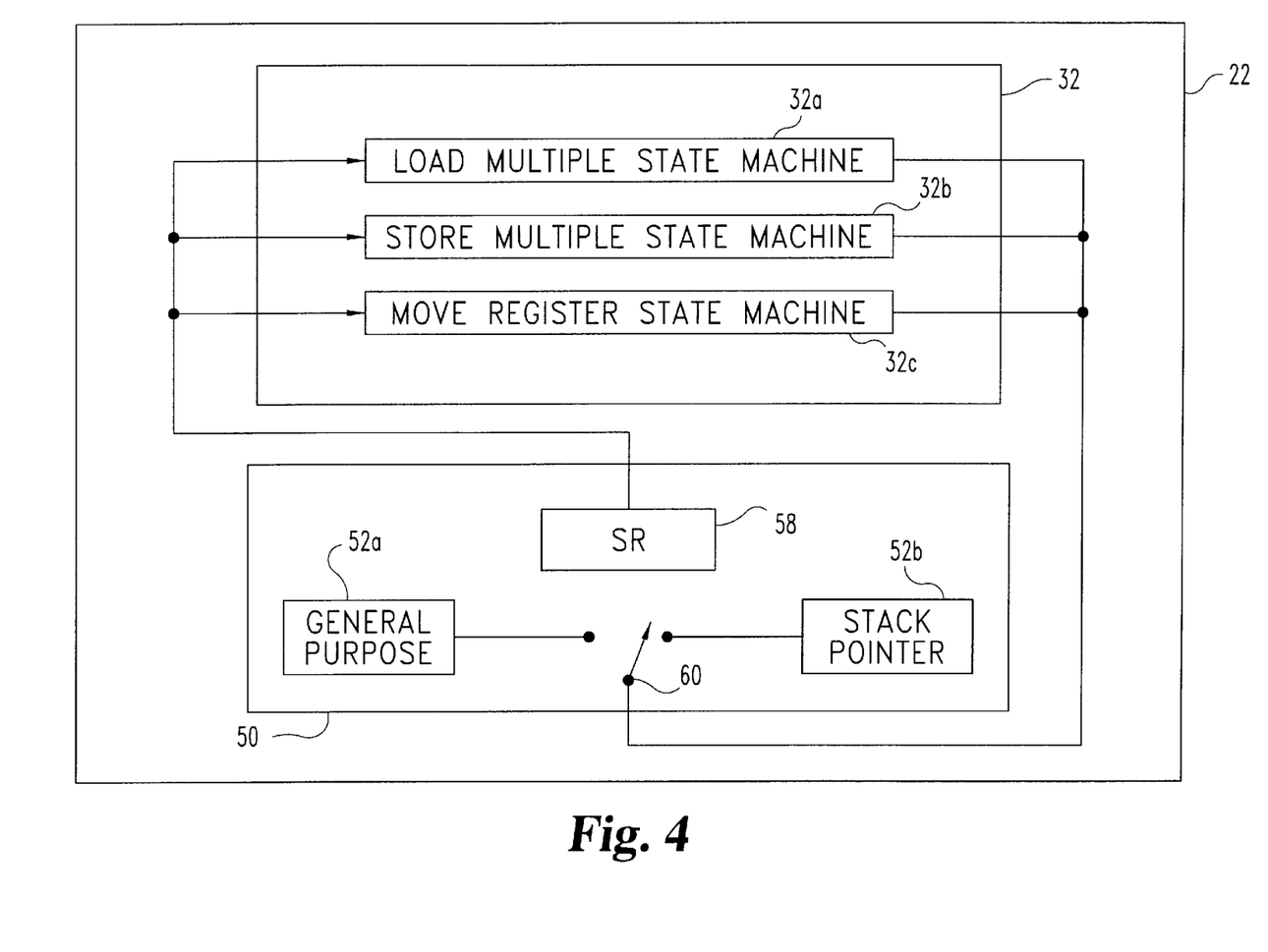
FIG. 4 is a diagrammatic view of a portion of a processor for the system of FIG. 1.

The diagram of FIG. 4 provides further description about the implementation of such an embodiment. As depicted in FIG. 4, register bank 50 is further illustrated with general purpose register 52a and stack pointer (SP) register 52b corresponding to register set 52. Registers 52a and 52b are each provided as a different hardware register of processor 22 and are referenced by a common assembly language programming name, R0. Naturally, in other embodiments, a different name could be selected. If the register name R0 is referenced by a program instruction, general purpose register 52a is normally accessed unless a bit is set in status register 58 to indicate access to stack pointer register 52b instead. Accordingly, the two states of status bit provide two conditions: one condition under which instruction references to R0 can be executed with general purpose register 52a and another condition under which instruction references to R0 can be executed with stack pointer register 52b.

The condition under which an instruction that references R0 with the stack pointer register 52b can be executed is further dependent on the instruction type. Specifically, only a subset of the programming instructions operable with general purpose register 52a are operable with status pointer register 52b. This subset includes a load multiple register (LDM) instruction, a store multiple register (STM) instruction, and a move register (MOV) instruction for which LDM State machine 32a, STM state machine 32b, and MOV state 32c of decoding and control logic 32 are illustrated in FIG. 4, respectively. These designations correspond to like instruction mnemonics for the ARM7 embodiment. State machines 32a, 32b, and 32c are symbolically connected to status register 58 to access the corresponding stack pointer access bit previously described. Switch 60 is depicted in FIG. 4 to symbolically represent selectivity of the state machines 32a, 32b, and 32c between registers 52a and 52b. It should be understood that in other embodiments, a different instruction subset having more or fewer instructions could be utilized to access stack pointer register 52b, or such limitations could be absent.

Figure 3A:
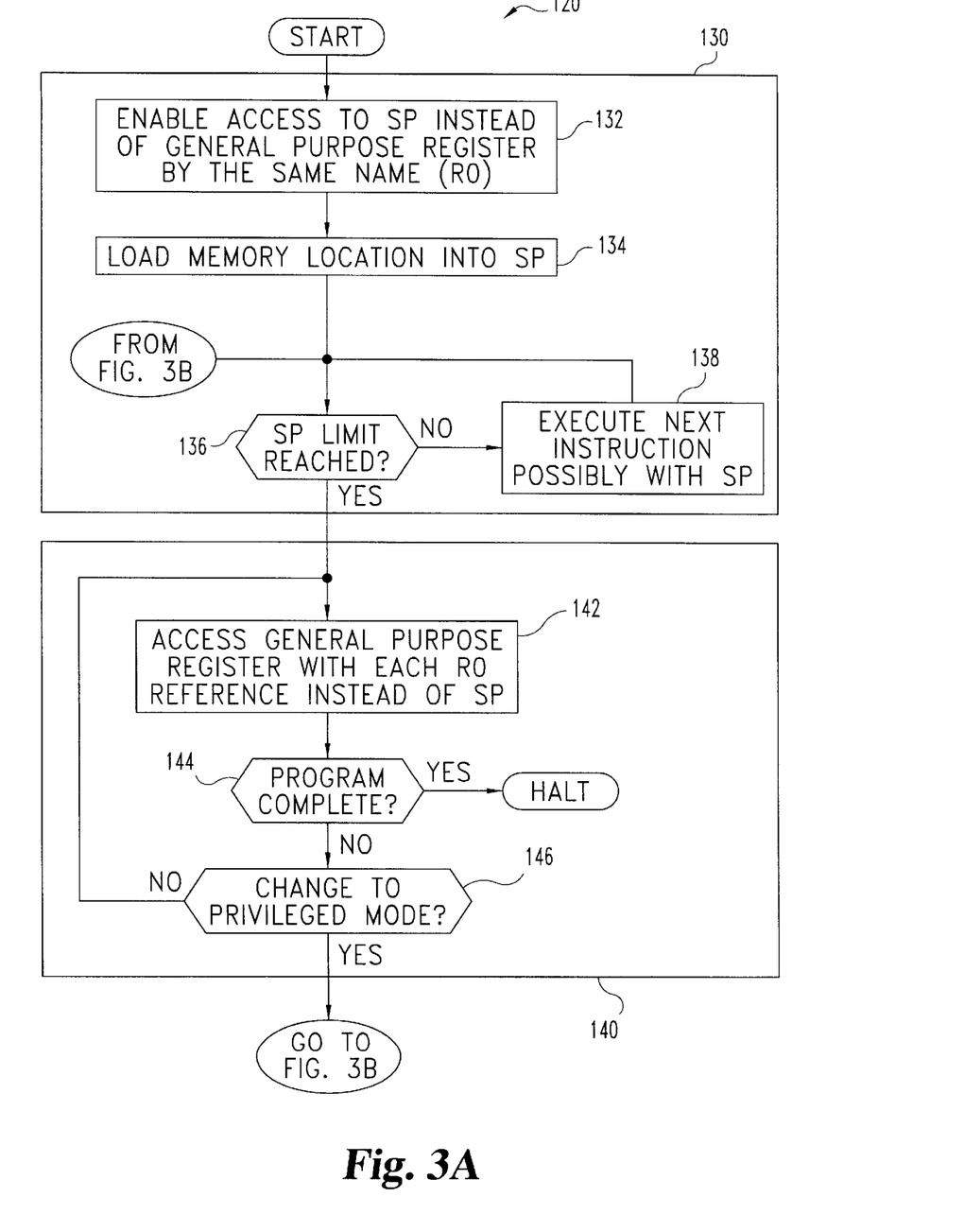
FIGS. 3A and 3B depict a flowchart illustrating a process according the present invention executable with the system of FIG. 1.
Figure 3B:
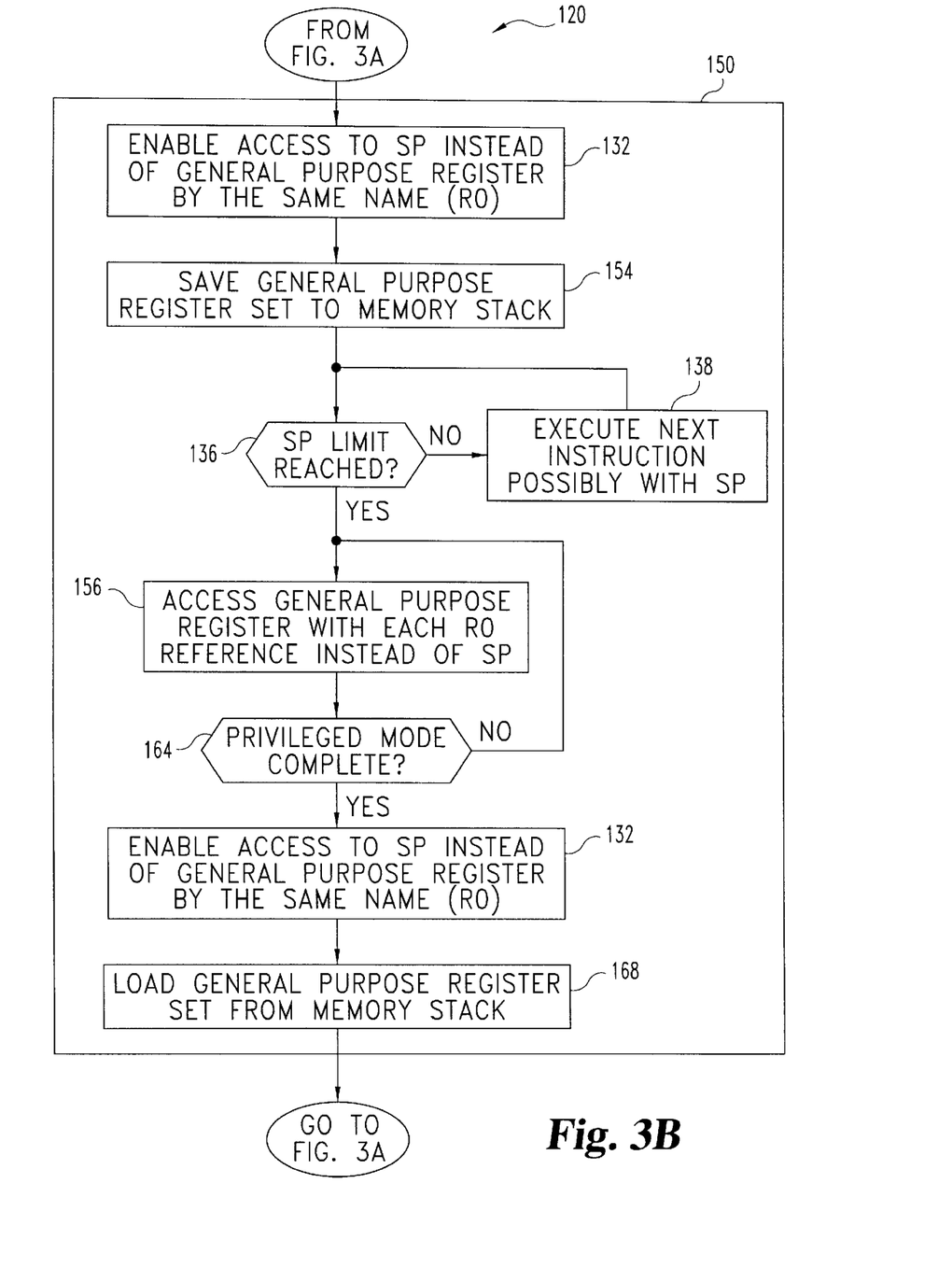

Procedure 120 of FIGS. 3A and 3B illustrates one example of an implementation of registers 52a and 52b in multiple processor operating modes. Procedure 120 starts with initialization routine 130. In routine 130, access to the stack pointer register 52b is enabled by setting a designated bit in status register 58 in operation 132. In operation 134, a memory location is loaded into stack pointer register 52b to serve as a pointer to a selected memory stack space in memory 24. The MOV state machine 32c is utilized to load stack pointer register 52b instead of general purpose register 52a in operation 134. In an alternative embodiment, the content of general purpose register 52a could also be changed in the same manner as the stack pointer register 52b by state machine 32c. For an ARM 7 implementation, a reserved status register bit, such as bit 24 of the ARM 7 status register CPSR, can be used to determine if execution is to be performed with the general purpose register 52a or the stack pointer register 52b. For this implementation, operation 132 can be performed by setting status register CPSR according to the instruction MSR CPSR_flg, #0x01000000, and operation 134 can be performed with a move register instruction as follows: MOV R0, #Stack_Location; where "Stack_Location" designates the address to be loaded as the pointer.

From operation 134, conditional 136 is reached. For every time status register 58 is set to permit access to stack pointer register 52b, only a limited quantity of instructions can be performed before execution automatically switches back to general register 52a. Conditional 136 tests for this instruction quantity limit. If the limit has not been reached, then operation 138 is encountered which executes the next instruction under the condition that if this instruction references register R0 and is of a type corresponding to one of state machines 32a, 32b, or 32c, it will be executed with stack pointer register 52b. After the next instruction is executed, routine 130 returns again to test the instruction quantity limit with conditional 136. Once the limit is reached, then initialization routine 130 is exited. In one embodiment, the instruction quantity limit is preset to only one instruction, such that the performance of only one instruction is permitted before conditional 136 becomes true. For this embodiment, conditional 136 will always be true following operation 134 so that operation 138 is never performed. In other embodiments, a different instruction quantity limit and/or a different way of limiting execution as would occur to one skilled in the art can be utilized.

From routine 130, procedure 120 continues with user mode routine 140. In routine 140, operation 142 indicates that each instruction that references the common register name R0 is executed with general purpose register 52a instead of stack pointer register 52b. From operation 142, routine 140 continues with conditional 144 to test whether the program has been completed. If the program has been completed, then procedure 120 halts. If the program has not been completed as tested by conditional 144, than conditional 146 is encountered which tests whether a change to a privileged operating mode has been triggered. If the test of conditional 146 is false, routine 140 loops back to operation 142 to continue accessing general purpose register 52a with each instruction reference to register R0 instead of stack pointer register 52b. If the test of conditional 146 is true, routine 140 is exited.

Referring specifically to FIG. 3B, from routine 140, procedure 120 continues with a privileged mode routine 152 such as an interrupt handler. Routine 150 begins with enabling access to stack pointer register 52b instead of general purpose register 52a for the next reference to register name R0 in operation 132 as previously described in connection with routine 130. From operation 132 of routine 150, operation 154 is encountered in which designated members of general purpose register set 52 are saved to the memory stack pointed to by stack pointer register 52b. STM state machine 32b is utilized to perform operation 154, which uses the contents of stack pointer register 52b to address the memory stack space (point to the stack) and stores the contents of the designated register(s) on the stack, including the general purpose register 52a if designated. Moreover, in one ARM7 implementation, state machine 32b stores the SPSR status register before storing any listed registers, and performs a "write back" to the stack pointer register 52b to automatically adjust its contents to point to a new storage location in accordance with a selected stack address management format. In the ARM 7 implementation, the following instruction can be used to save the entire register set including the contents of the general purpose register 52a also designated by R0: STMIA R0, {R0–R14}.

From operation 154 of routine 150, conditional 136 as previously described in connection with routine 130 is again encountered. If the test of conditional 136 is negative, the next instruction is executed as described for routine 130. If the test of conditional 136 is affirmative, routine 150 continues with stage 156. In stage 156 each reference to R0 is executed with general purpose register 52a instead of stack pointer register 52b. From stage 156, conditional 164 is encountered which tests whether the privileged mode operation has been completed. If the test of conditional 164 is negative, routine 150 loops back to stage 156. If the test of conditional 164 is affirmative, routine 150 continues with operation 132 as previously described to again enable access to stack pointer register 52b. From the second occurrence of operation 132 in routine 150, stage 168 is encountered in which the contents of the general purpose register set 52 that were saved in the memory stack during operation 154 are restored using a load multiple instruction executed with the LDM state machine 32a. LDM state machine 32a utilizes the contents of stack pointer register 52a to point to the memory stack and loads the contents of a designated list of general purpose registers from the memory stack, including the contents of the general purpose register 52a if designated. In one ARM7 implementation, the SPSR register is loaded first, before the listed registers, and write back is performed for the given stack address management scheme to the stack pointer register 52b. For this ARM7 implementation, an instruction to execute stage 168 is as follows: LDMIA R0, {R0–R14}. From stage 168, routine 150 is exited, having restored the prior state of the user mode operation. Accordingly, initialization routine 130 is again entered to perform the instruction limit test of conditional 36 before resuming user mode operation in routine 140.

In other embodiments, conditional access to two or more registers having a common register name is utilized for register types and/or combinations of register types besides general purpose and stack pointer register varieties. Moreover, in further embodiments, it should be appreciated that one or more other conditions in addition or as an alternative to a status register bit can be used to enable instruction execution with a selected one of a number of registers having a common register name. By way of non-limiting example, a change in mode could automatically trigger stack pointer utilization.

Also, different limitations on one or more register instruction reference techniques can be utilized or such limitations can be absent. In further embodiments, multiple registers having a common identifier can be utilized with other types of programmed apparatus or devices that may or may not include multiple operating modes. Alternatively or additionally, in still further embodiments of the present invention, access to a given register can be limited or constrained according to the present invention either with or with other described features.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
    operating a processor including two or more registers, the registers including a first register and a second register having a register name in common;
    under a first condition, referencing the register name with a programming instruction to load a pointer to a memory space in the first register;
    executing another programming instruction that refers to the register name under a second condition to change contents of the second register; and
    storing the contents of the second register in the memory space based on the pointer.

2. The method of claim 1, wherein the first condition is established if a designated status value is provided as a precondition to said referencing and the programming instruction is one of a designated subset of different instruction types operable with the second register.

3. The method of claim 1, further comprising providing a preset instruction quantity limit for instruction performance with the first register for each time the first condition is established.

4. The method of claim 3, wherein the preset instruction quantity limit is one.

5. The method of claim 1, further comprising changing from a user operating mode of the processor to an interrupt processing mode of the processor, said storing being performed in response to said changing.

6. The method of claim 5, wherein the memory space defines a stack for saving the registers and said storing includes storing the contents of all the registers to the stack, and further comprising:
   executing an interrupt routine after said changing; and
   restoring the contents of all the registers based on contents of the first register.

7. The method of claim 1, wherein the first condition corresponds to a first state of a status bit and the second operating condition corresponds to a second state of the status bit, the second state being the inverse of the first state.

8. A method, comprising:
   operating a processor including two or more registers, the registers including a general purpose register and a stack pointer register having a register name in common;
   referencing the register name with a programming instruction; and
   performing the programming instruction with the general purpose register under a first condition and the stack pointer register under a second condition.

9. The method of claim 8, wherein the second condition is established if a designated status value is provided as a precondition to said referencing and the programming instruction is one of a designated subset of different instruction types operable with the general purpose register.

10. The method of claim 8, farther comprising providing a preset instruction quantity limit for instruction performance with the stack pointer register for each time the second condition is established.

11. The method of claim 10, wherein the preset instruction quantity limit is one.

12. The method of claim 8, further comprising:
   executing a user program with the general purpose register in a common mode of processor operation;
   saving state of the general purpose register in a memory stack defined with the stack pointer register in response to an interrupt;
   executing an interrupt routine with the general purpose register in an interrupt mode of processor operation after said saving; and
   restoring state of the general purpose register by executing an instruction with the stack pointer register.

13. The method of claim 8, wherein the first condition corresponds to a first state of a status bit and the second condition corresponds to a second state of the status bit, the second state being an inverse of the first state.

14. A method, comprising:
   operating a processor including a first register and a second register, the first register and the second register being identified by a common register name;
   executing a number of instructions referencing the common register name with the first register unless a predefined condition is established; and
   for each establishment of the predefined condition, providing a preset instruction quantity limit for instruction performance with the second register instead of the first register.

15. The method of claim 14, wherein the preset instruction quantity limit is one.

16. The method of claim 14, wherein the predefined condition corresponds to a designated status value provided as a precondition to the instruction performance with the second register.

17. The method of claim 14, wherein the predefined condition is based on a status register bit state.

18. The method of claim 14, further comprising defining a stack pointer with the second register and transferring contents of the first register to and from a memory stack based on the stack pointer.

19. An apparatus, comprising: a programmable circuit including two or more registers, the registers including a general purpose register and a stack pointer register having a common register name, the circuit including logic responsive to programming to perform a programmed instruction referencing the common register name with the general purpose register under a first condition and with the stack pointer register under a second condition.

20. The apparatus of claim 19, further comprising a memory coupled to the programmable circuit and wherein logic is further responsive to the programming to store a memory pointer in the stack pointer register and to transfer the contents of the registers to and from a stack defined in the memory designated with the memory pointer.

21. The apparatus of claim 19, wherein the programmable circuit is in the form of an integrated circuit device.

22. The apparatus of claim 19, wherein the programmable circuit defines a processor including an arithmetic/logic unit coupled to the registers.

23. The method of claim 19, wherein the logic is further operable to define a number of different operating modes of the processor each permitting access to the general purpose register if the first condition is satisfied.

24. The apparatus of claim 19, wherein the registers include a status register and the first condition corresponds to a first state of a bit of the status register and the second condition corresponds to a second state of the bit of the status register, the first state being the inverse of the second state.

25. The method of claim 19, wherein the second condition is established if a designated status value is provided and the programmed instruction is one of a designated subset of different instruction types operable with the general purpose register.

26. The method of claim 19, wherein the logic is operable to provide a preset instruction quantity limit for instruction performance with the stack pointer register for each time the first condition is established.

27. An apparatus arranged to operate with a processor that includes a general purpose register and a stack pointer register having a program identifier in common, the apparatus, comprising:
   programming Instructions operable to establish a stack pointer access condition; load a pointer to a memory space into the stack pointer register by reference to the register name in response to establishment of the stack pointer access condition; reference the register name to perform a user routine with the general purpose register under an operating condition different than the stack potter access condition; re-establish the stack pointer register access condition and store contents of the general purpose register in the memory space based on the pointer in response to an interrupt; perform an interrupt routine with the general purpose register; and restore the contents of the general purpose register from the memory space based on the pointer after performance of the interrupt routine.

28. The apparatus of claim 27, wherein the programming instructions are further operable to change the contents of the stack pointer register after storing the contents of the general purpose register in the memory space and before the performance of the interrupt routine.

29. The apparatus of claim 27, wherein the programming instructions are further operable to save a number of different registers in addition to the stack pointer register and the general purpose register in the memory space based on the pointer in response to the interrupt.

30. The apparatus of claim 29, wherein the apparatus is in the form of a memory device.

\* \* \* \* \*